(12) United States Patent
Naito et al.

(10) Patent No.: US 6,430,224 B1
(45) Date of Patent: Aug. 6, 2002

(54) STEREO VIDEO DATA CODING APPARATUS

(75) Inventors: Sei Naito; Shuichi Matsumoto, both of Tokyo (JP)

(73) Assignee: KDD Corporation, Tokyo (JP)

( * ) Notice: Subject to any disclaimer, the term of this patent is extended or adjusted under 35 U.S.C. 154(b) by 0 days.

(21) Appl. No.: 09/255,189

(22) Filed: Feb. 22, 1999

(30) Foreign Application Priority Data

Mar. 3, 1998 (JP) .......................................... 10-067859

(51) Int. Cl.$^7$ ................................................ H04N 7/12
(52) U.S. Cl. ............................ 375/240.16; 375/240.02; 348/42
(58) Field of Search ..................... 375/240.02, 240.03, 375/240.12, 240.1, 240.16, 240.24; 348/42, 43, 47, 384.1, 397.1, 402.1, 407.1, 409.1, 413.1, 416.1, 420.1; 382/232, 234, 236; H04N 7/12

(56) References Cited

U.S. PATENT DOCUMENTS 5,619,256 A * 4/1997 Haskell et al. ................. 348/43
6,111,596 A * 8/2000 Haskell et al. ................. 348/42
6,160,574 A * 12/2000 Oba et al. ...................... 348/46

* cited by examiner

Primary Examiner—Nhon Diep
(74) Attorney, Agent, or Firm—Westman, Champlin & Kelly, P.A.

(57) ABSTRACT

A corresponding MB2 for the left sequence is determined from the parallax vector of a coding-object MB1 of the frame Bi for the right sequence. The motion vector ② of the corresponding MB2 is used as an origin of the search area for finding the motion vector of the coding-object MB1. As an alternative, the motion vector ③ of MB3 adjacent to the coding-object MB1 is used as an origin of the search area for finding a motion vector of the coding-object MB1. As another alternative, the motion vector ② or ③, whichever is higher in utility evaluation, is used as an origin. As a result, both the search area and the circuit size for detecting a motion vector can be reduced. This configuration provides a stereo video data motion vector coding apparatus small in circuit size and capable of detecting a motion vector with high accuracy.

12 Claims, 5 Drawing Sheets

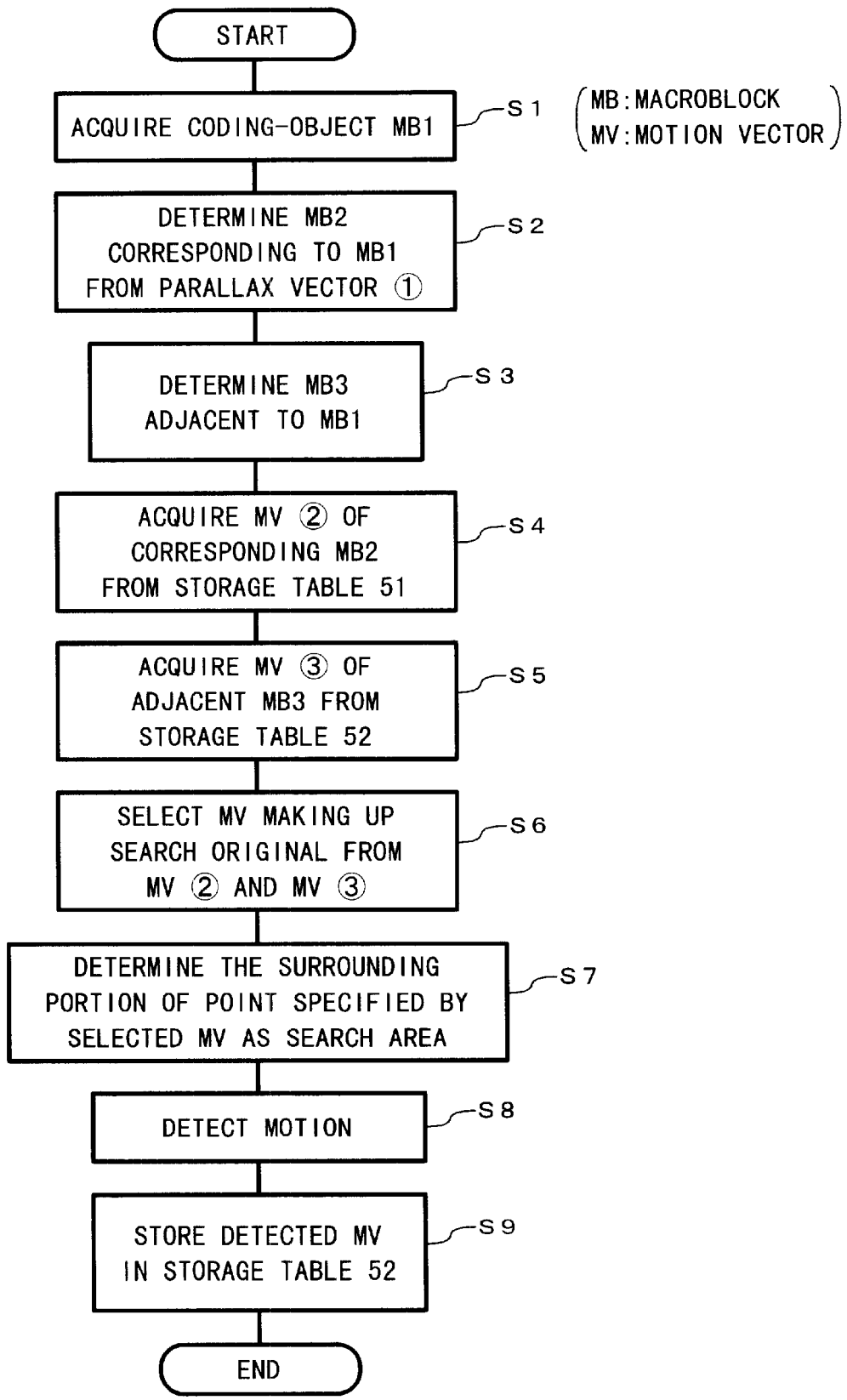

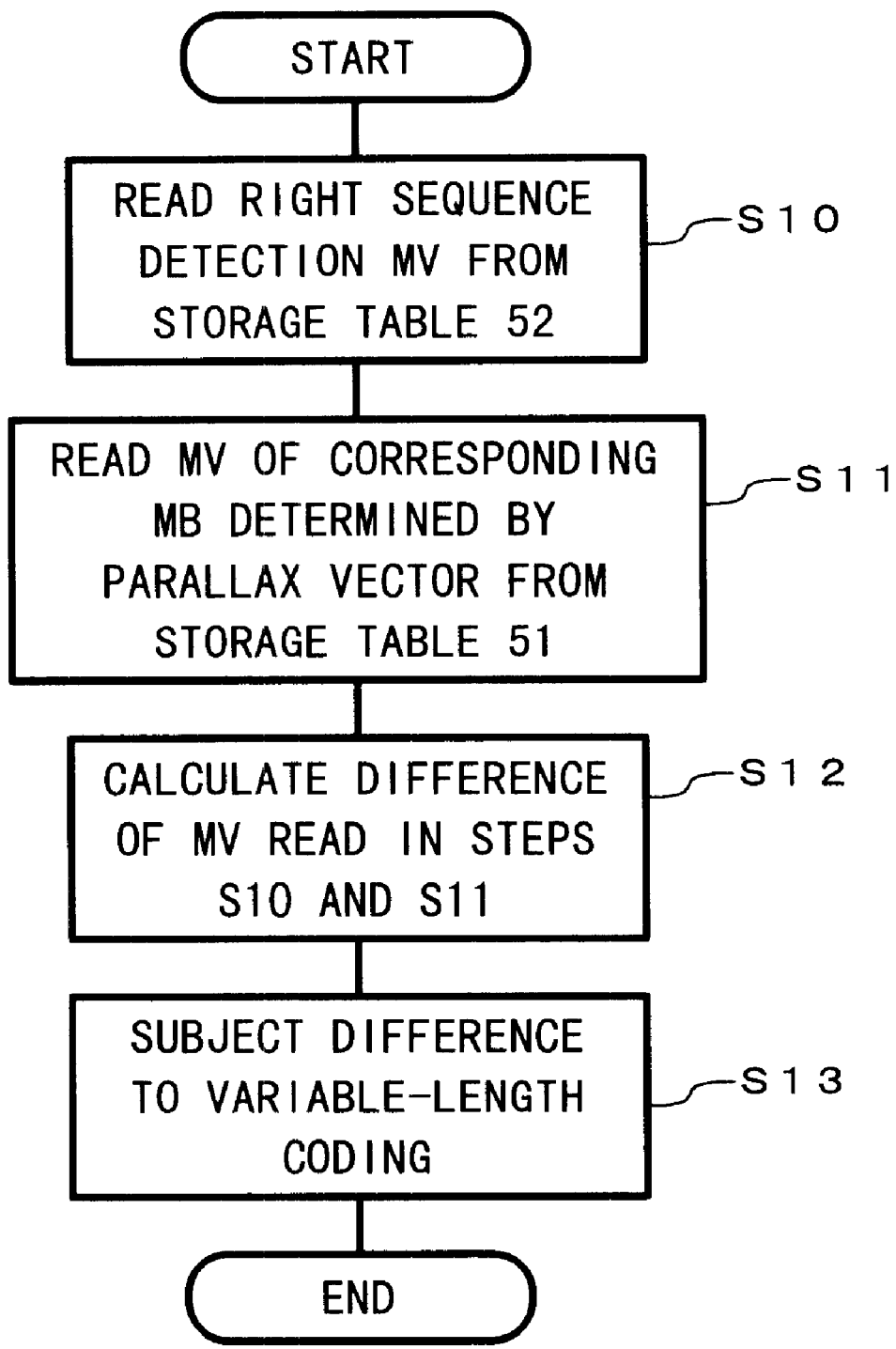

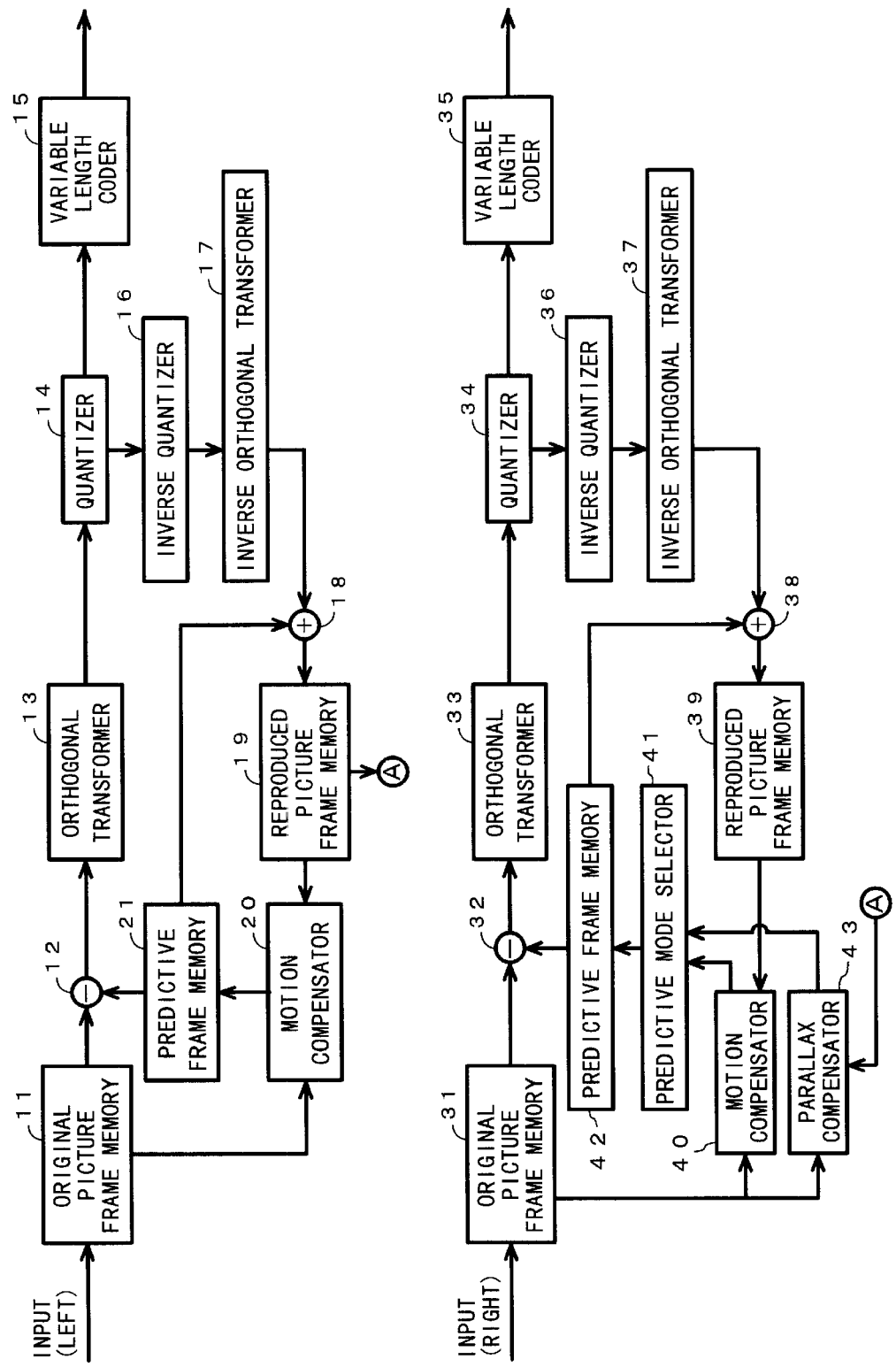

STEREO VIDEO DATA CODING APPARATUS

BACKGROUND OF THE INVENTION

1. Field of the Invention

The present invention relates to a stereo video data coding apparatus, or in particular, to a stereo video data coding apparatus for transmitting a motion vector and a predictive error of the stereo video data subjected to motion compensation through one channel and transmitting a motion vector, a parallax vector and a predictive error of the stereo video data subjected to motion compensation and parallax compensation through the other channel.

2. Description of the Related Art

An example of a conventional stereo video data coding apparatus will be explained with reference to the block diagram of FIG. 5. The stereo video data coding apparatus comprises two coders for coding video data of left and right channels.

The coder for the left channel (or the basic channel) includes an original picture frame memory 11 for storing the original image, a subtractor 12 for generating a predictive error signal, an orthogonal transformer 13 for performing orthogonal transformation such as DCT transformation of the predictive error signal output from the subtractor 12, a quantizer 14 for quantizing the data subjected to orthogonal transformation, and a variable length coder 15 for subjecting the quantized data to variable length coding. The coder further includes an inverse quantizer 16 for inversely quantizing the data quantized by the quantizer 14, an inverse orthogonal transformer 17, an adder 18, a reproduced picture frame memory 19 for temporarily storing a reproduced picture, a motion compensator 20 for performing motion compensation with the original picture from the original picture frame memory 11 and the reproduced picture, and a predictive picture frame memory 21.

The coder for the right channel (or the extended channel), on the other hand, includes component parts 31 to 40 and 42 similar to the coder for the left channel described above, except for a predictive mode selector 41 and a parallax compensator 43. The reproduced picture from the reproduced picture frame memory 19 is applied to the parallax compensator 43.

In this configuration, the left channel is coded based on the normal motion compensation and DCT. The right channel, on the other hand, is coded based on motion compensation or parallax compensation and DCT. Specifically, the prediction mode selector 41 selects the motion compensator 40 and the parallax compensator 43, whichever is lower in predictive error, and connects to the predictive picture frame memory 42. Other operations are similar to those for the left channel.

In the prior art described, however, the motion compensator 40 for the right channel has a configuration of the same size as the motion compensator 20 for the left channel, thereby posing the problem of the magnitude of the circuit size. The motion vector search of a particular macroblock, for example, is conducted in the range of ±128 pixels by ±32 lines. For realizing this with a LSI for motion detection which covers the range of ±8 pixels by ±8 lines, for example, 64 LSI chips are required.

SUMMARY OF THE INVENTION

The object of the present invention is to provide a stereo video data motion vector coding apparatus which obviates the problems of the prior art described above and can detect motion vectors with small circuit size and high accuracy.

The first aspect of the invention lies in that a stereo video data coding apparatus comprises means for determining a macroblock on the basic channel corresponding to each macroblock constituting a unit of motion vector detection of the extended channel from the parallax vector between the two channels and acquiring a motion vector of said corresponding macroblock and means for determining the detection area of the motion vector of the macroblock constituting a unit of motion vector detection of said extended channel based on said acquired motion vector.

The second aspect of the invention lies in that a stereo video data coding apparatus comprises means for acquiring a motion vector of an adjacent macroblock for each macroblock constituting a unit of motion vector detection of the extended channel.

The third aspect of the invention lies in that a stereo video data coding apparatus comprises means for evaluating the utility of said acquired motion vectors and means for determining the detection area of the motion vector of the macroblock constituting a unit of motion vector detection of said extended channel based on a motion vector high in utility evaluation.

The fourth aspect of the invention lies in that the range of motion vector detection of a macroblock constituting a unit of motion vector detection of the extended channel is limited to the acquired motion vector described above, motion vectors high in evaluation or motion vectors in the neighborhood thereof.

According to the first to third aspects described above, a highly accurate motion vector can be used as a reference for determining the motion vector detection range of the macroblock of the extended channel. As a result, the range of motion vector detection can be reduced remarkably as compared with the prior art. Also, according to the fourth aspect, the motion vector detection range can be reduced to a very small area of ±8 pixels by ±8 lines, for example, around the macroblock corresponding to the acquired motion vector or the motion vector high in evaluation.

BRIEF DESCRIPTION OF THE DRAWINGS

FIG. 2 is a flowchart showing the operation according to an embodiment of the invention.

FIG. 4 is a flowchart showing the operation of an embodiment of the invention.

FIG. 5 is a block diagram showing a conventional stereo video data coding apparatus.

DETAILED DESCRIPTION OF THE PREFERRED EMBODIMENT

Figure 1:
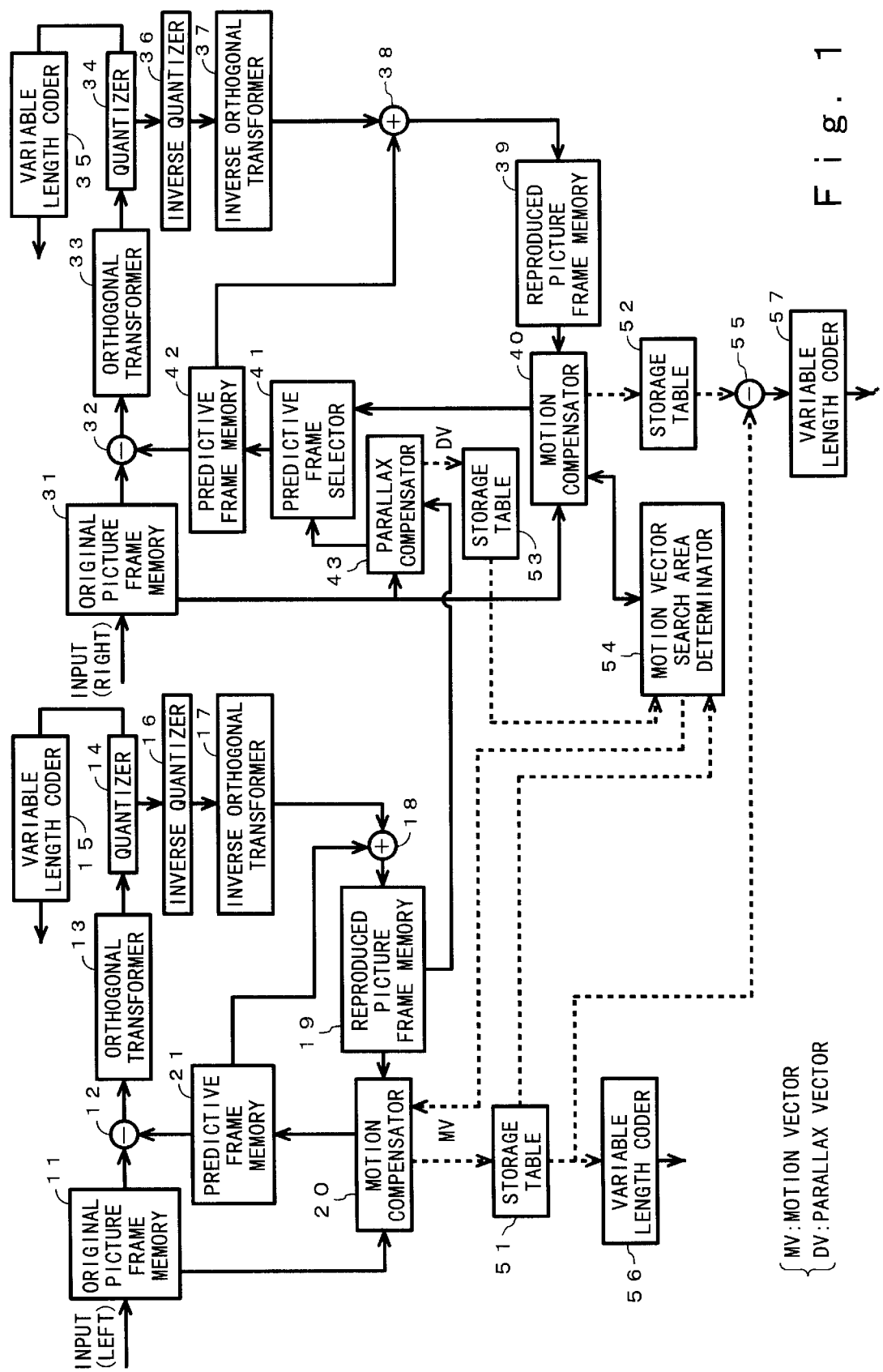
FIG. 1 is a block diagram showing a stereo video data coding apparatus according to this invention.

The present invention will be explained in detail with reference to the accompanying drawings. As shown in FIG. 1, a stereo video data coding apparatus according to an embodiment of the invention comprises a storage table 51 for storing a motion vector MV obtained from a left channel motion compensator 20, storage tables 52, 53 for storing the motion vector MV and the parallax vector DV obtained from the right channel motion compensator 40 and a parallax compensator 43, respectively, a motion vector search area determinator 54 for determining a search area of the right channel motion vector with reference to the motion vector MV and the parallax vector DV stored in the storage tables 51 to 53, and variable length coders 56, 57 for subjecting the motion vector to the variable length coding. The other component parts of the configuration are designated by the same reference numerals as the corresponding or equivalent component parts, respectively, in FIG. 5. Also, in FIG. 1, the solid lines represent the image data signal, the prediction error signal or the like signal associated with the image, and the dotted lines represent the motion vector MV and the parallax vector DV.

Now, the operation of this embodiment will be explained with reference to FIGS. 1 to 3. FIG. 2 is a flowchart showing the operation of the motion vector search area determinator 54, and FIG. 3A–3C diagrams for explaining the same operation. This embodiment has the feature in the right channel motion vector search area determinator 54 and the coding of the motion vector, while the operation of the remaining parts is identical or equivalent to that of the other embodiments. Therefore, an explanation will be given below only of the operation of the motion vector search area determinator 54 and the operation of coding the motion vector.

In step S1 of FIG. 2, the motion vector search area determinator 54 acquires a macroblock to be coded (hereinafter referred to as the coding-object MB1) of the right channel from the motion compensator 40. In step S2, a corresponding macroblock 2 for the left channel (hereinafter referred to as the corresponding MB2) is determined from the parallax vector DV of the coding-object MB1. Then, step S3 determines a macroblock 3 (hereinafter referred to as the adjacent MB3) adjacent to the coding-object MB1 of which the motion vector has already been determined.

Figure 3A:
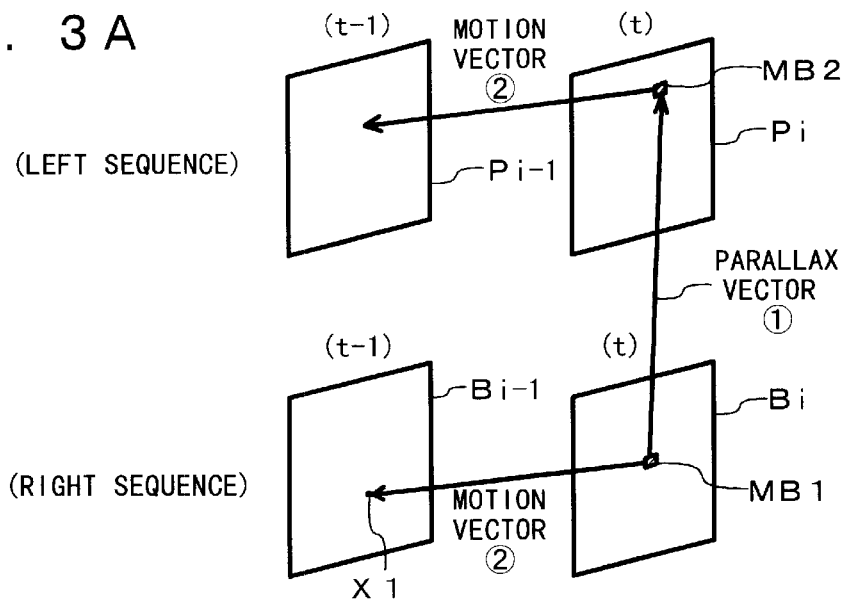
FIG. 3A, 3B and 3C are diagrams for explaining the same embodiment.
Figure 3B:
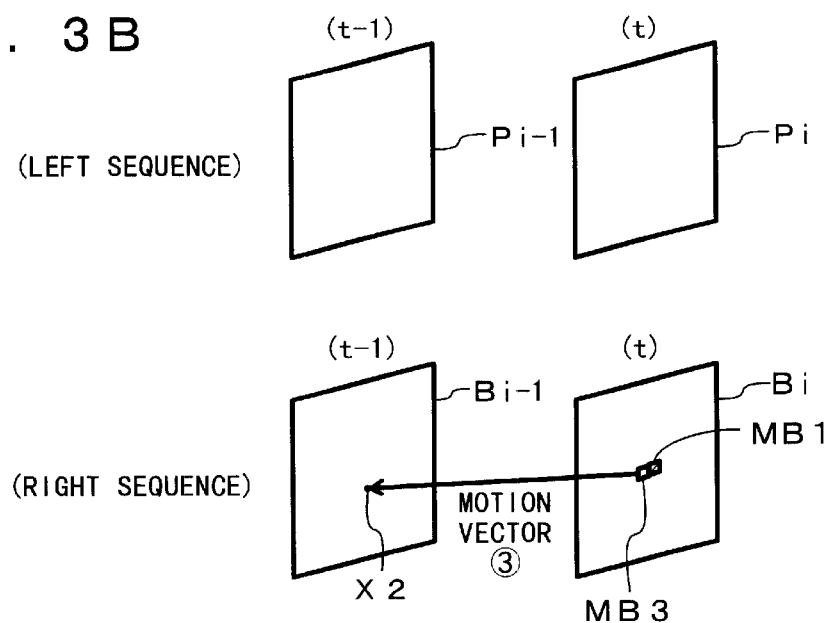
Figure 3C:
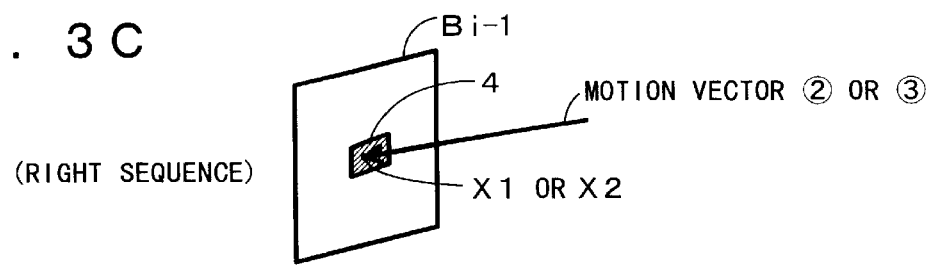

Specifically, as shown in FIGS. 3A and 3B, assume that Pi and Bi designate the frames of the video data at a given time point t for the left and right sequences, respectively, and Pi-1, Bi-1 designate the immediately preceding frames. In step S1, the coding-object MB1 in the frame Bi is acquired. Also, in step S2, the corresponding MB2 in the frame Pi is determined based on the parallax vector ① of the coding-object MB1. In step S3, on the other hand, as shown in FIG. 3B, a MB3 adjacent to the coding-object MB1 is determined in the frame Bi. The frame Bi starts to be coded from the MB at the upper left corner, and the adjacent MB immediately to the left of the coding-object MB1 is preferably selected as the adjacent MB3. As an alternative, however, an adjacent MB to the immediately upper, upper left or upper right of the coding-object MB1 can be selected Next, in step S4 of FIG. 2, the motion vector ② of the corresponding MB2 determined in step S2 is acquired from the storage table 51 for the left sequence. The motion vector ② is assumed as a motion vector of the coding-object MB1. The corresponding MB2 is a macroblock for the left sequence corresponding to the parallax vector of the coding-object MB1. Therefore, the corresponding MB2 generally exists in the search range of parallax vectors defined as (plus or minus several pixels)+(plus or minus several lines) of the coding-object MB1. Also, according to this embodiment, the left sequence is coded several lines in advance of the right sequence. As a result, the motion vector ② always exists as long as the motion vector for the corresponding MB2 is detected.

In step S5, the motion vector ③ of the adjacent MB3 determined in step S3 is acquired from the storage table 52 for the right sequence. In step S6, a motion vector high in utility evaluation is selected from the motion vectors ② and ③, and the origin of the search area of the motion vector of the coding-object MB1 is determined from the motion vector thus selected.

Specifically, the predictive errors with the coding-object MB1 and the adjacent MB3 are determined when the motion vectors ② and ③ are used for them, respectively, so that the motion vector involving a smaller predictive error is selected. This predictive error can be determined from the sum of the absolute values or the sum of squares of the two predictive errors MB. As an alternative method, the coding modes of the corresponding MB and the adjacent MB can be used for evaluation.

In step S7, the portion around the point specified by the motion vector MV selected in step S6 is determined as a search area. Specifically, as shown in FIG. 3C, an area smaller than in the prior art is determined as a search area 4 around the point X1 or X2 specified by the motion vector selected in step S6. As a specific example, the area defined by ±8 pixels and ±8 lines around the macroblock corresponding to the point X1 or X2 is determined as the search area 4. In step S8, the motion vector is detected within the search area 4, and in step S9, the motion vector detected in step S8 is stored in the storage table 52.

As described above, according to this embodiment, the motion vector of the macroblock for the right channel is detected by determining the search area for motion detection based on the motion vector of the left-channel macroblock determined by the parallax vector of the right-channel macroblock or based on the motion vector of the macroblock adjacent to the right-channel macroblock. As a result, the motion vector detection accuracy is improved even when the search area is small. Therefore, only one LSI chip is sufficient for motion detection, and the circuit size can be reduced remarkably compared with the prior art.

In the present embodiment, the motion vector detection accuracy is superior in spite of a small search area. It is by reason of the fact that the corresponding MB2 of the frame Pi and the coding-object MB1 for the frame Bi, though different data due to the difference in parallax, are originally the images of the same object. Therefore, the chance is very high that the motion vectors of the macroblocks MB2 and MB1 are identical or equivalent to each other. Also, the images of the coding-object MB1 and the adjacent MB3 are adjacent to each other, which is another reason that the motion vectors of the two macroblocks MB1 and MB3 are very likely to be identical or equivalent to each other. Further, according to this embodiment, the better one of the two motion vectors which are very likely to be identical or equivalent is selected in step S6, and therefore the selected motion vector is considered very high in accuracy. The optimum motion vector should be located in the vicinity of the selected motion vector, and therefore a small motion vector search area is sufficient.

Also, according to this embodiment, the motion vector constituting the origin of search is selected from the motion vectors ② and ③ in step S6. The invention, however, is not limited to such a method of selection, but one of the motion vectors ② and ③ can be determined as an origin of a motion vector which is an origin of search.

Now, the operation of coding the motion vector for the right channel will be explained with reference to FIG. 4. In step S10, the MV of the right sequence detected in step S9 is read from the storage table 52. Then, in step S11, the MV of the corresponding macroblock of the left channel determined from the parallax vector is read from the storage table 51. Next, the MVs read in steps S10, S11 are applied to the subtractor 55 (FIG. 1) thereby to calculate the difference between them. In step S13, the difference is applied to and subjected to variable-length coding by the variable-length coder 57, and together with the output data of the variable-length coder 35, sent out to the line.

As apparent from the foregoing description, according to this invention, the motion vector of the corresponding macroblock on the basic channel determined according to the parallax vector of the coding-object MB of the extended channel, the motion vector of the MB adjacent to the coding-object MB or one of these motion vectors higher in utility evaluation is used as an origin of the search area for motion detection of the coding-object MB of the extended channel. Therefore, the search area can be determined by a highly accurate motion vector. Also, this makes it possible to detect a highly accurate motion vector by the search in a search area remarkably smaller than in the prior art. Further, the number of LSI chips for motion detection can be reduced considerably. For example, the conventionally required 64 chips can be reduced to one.

Take the three-dimensional HDTV (high-definition TV), for example. In the conventional method in which the motion compensation is effected independently for the right sequence, the ±128 pixels by ±32 lines required as a search area can be reduced to 1/64, i.e. to ±8 pixels by ±8 lines according to the invention. Experiments conducted by the present inventor have verified that this reduction of search area can still maintain the detection accuracy of the motion vector. The search area covered by the multi-purpose motion detection circuit currently available on the market is generally ±8 pixels by ±8 lines. According to the present invention, therefore, only one chip is required as compared with 64 chips required in the conventional method. Thus, the motion detection considered the nucleus technique of the stereo video data coding apparatus can be realized with a small number of parts and at low cost. Also, the detection speed of the motion vector can be improved.

What is claimed is:

1. A stereo video data coding apparatus for performing the motion compensation coding with one channel as a basic channel and performing both the motion compensation coding and the parallax compensation coding with the other channel as an extended channel, comprising:

means for determining a macroblock on the basic channel corresponding to each macroblock constituting a unit of motion vector detection of the extended channel from the parallax vector between the two channels and acquiring a motion vector of said corresponding macroblock; and means for determining the detection area of the motion vector of the macroblock constituting a unit of motion vector detection of said extended channel based on said acquired motion vector.

2. A stereo video data coding apparatus for performing the motion compensation coding with one channel as a basic channel and performing both the motion compensation coding and the parallax compensation coding with the other channel as an extended channel, comprising:

means for acquiring a motion vector of an adjacent macroblock for each macroblock constituting a unit of motion vector detection of the extended channel; and means for determining the detection area of the motion vector of the macroblock constituting a unit of motion vector detection of said extended channel based on said acquired motion vector.

3. A stereo video data coding apparatus for performing the motion compensation coding with one channel as a basic channel and performing both the motion compensation coding and the parallax compensation coding with the other channel as an extended channel, comprising:

means for determining a macroblock on the basic channel corresponding to each macroblock constituting a unit of motion vector detection of an extended channel from the parallax vector between the two channels and acquiring a motion vector of said corresponding macroblock;

means for acquiring a motion vector of the adjacent macroblock for each macroblock constituting a unit of motion vector detection of said extended channel;

means for evaluating the utility of said acquired motion vectors; and means for determining the detection area of the motion vector of the macroblock constituting a unit of motion vector detection of said extended channel based on a motion vector high in utility evaluation.

4. A stereo video data coding apparatus according to claim 1, wherein the detection area of the motion vector of the macroblock constituting a unit of motion vector detection of said extended channel is limited to selected one of said acquired motion vector, said motion vector high in evaluation, and a motion vector in the vicinity of at least one of said two motion vectors.

5. A stereo video data coding apparatus according to claim 2, wherein the detection area of the motion vector of the macroblock constituting a unit of motion vector detection of said extended channel is limited to selected one of said acquired motion vector, said motion vector high in evaluation, and a motion vector in the vicinity of at least one of said two motion vectors.

6. A stereo video data coding apparatus according to claim 3, wherein the detection area of the motion vector of the macroblock constituting a unit of motion vector detection of said extended channel is limited to selected one of said acquired motion vector, said motion vector high in evaluation, and a motion vector in the vicinity of at least one of said two motion vectors.

7. A stereo video data coding apparatus according to claim 3, wherein said means for evaluating the utility of the acquired motion vector based on the predictive error of said corresponding macroblock and said adjacent macroblock.

8. A stereo video data coding apparatus according to claim 3, wherein said means for evaluating the utility of the acquired motion vector based on the coding mode of said corresponding macroblock and said adjacent macroblock.

9. A stereo video data coding apparatus according to claim 7, wherein said predictive error of the macroblocks is estimated from the sum of the absolute values or the sum of squares of the predictive errors macroblocks.

10. A stereo video data coding apparatus according to claim 1, further comprising:

means for producing a prediction value of the motion vector of the macroblock of sa id extended block from said motion vector detection area;

means for determining the difference between the motion vector constituting a reference for searching said motion vector detection area and the prediction value; and means for coding said difference.

11. A stereo video data coding apparatus according to claim 2, further comprising:

means for producing a prediction value of the motion vector of the macroblock of said extended block from said motion vector detection area;

means for determining the difference between the motion vector constituting a reference for searching said motion vector detection area and the prediction value; and means for coding said difference.

12. A stereo video data coding apparatus according to claim 3, further comprising:

means for producing a prediction value of the motion vector of the macroblock of said extended block from said motion vector detection area;

means for determining the difference between the motion vector constituting a reference for searching said motion vector detection area and the prediction value; and means for coding said difference.

* * * * *